US012031380B1

(12) United States Patent
Figley

(10) Patent No.: US 12,031,380 B1
(45) Date of Patent: Jul. 9, 2024

(54) LOCKOUT TOOL ASSEMBLY FOR AUTOMATIC CLOSING FIRE-RATED ROLL UP DOORS

(71) Applicant: Triad National Security, LLC, Los Alamos, NM (US)

(72) Inventor: Reed Richard Figley, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 18/514,604

(22) Filed: Nov. 20, 2023

(51) Int. Cl.
*E06B 9/80* (2006.01)

(52) U.S. Cl.
CPC .......... *E06B 9/80* (2013.01); *E06B 2009/802* (2013.01)

(58) Field of Classification Search
CPC ........... E05Y 2201/22; E06B 2009/801; E06B 2009/802; E06B 9/80; E06B 9/82; E06B 9/84
See application file for complete search history.

(56) References Cited

U.S. PATENT DOCUMENTS 287,715 A * 10/1883 Porter ................. E05B 15/0093 292/108
868,466 A * 10/1907 Mayo ...................... E05B 85/22 292/173
972,426 A * 10/1910 Wilson ...................... E06B 9/82 160/8
1,411,824 A * 4/1922 Wepplo ................. E05B 67/383 292/205
1,550,454 A * 8/1925 Provost ................... B60C 27/08 24/598.5
1,875,400 A * 9/1932 Wood .................... F16B 45/035 24/598.5
2,700,887 A * 2/1955 Oxhandler .......... E05B 65/0025 70/451
3,235,246 A * 2/1966 Cowan .................. E05F 15/684 49/139
3,976,315 A * 8/1976 Braun ................... E06B 11/021 292/113
4,085,599 A * 4/1978 Fischer ................. E05B 67/383 70/14
4,694,667 A * 9/1987 Hodge .................... F16G 15/04 24/598.5
4,813,305 A * 3/1989 Dilich ..................... E05F 15/41 160/188
4,890,354 A * 1/1990 Cooper ..................... E06B 9/80 16/87 R
5,001,861 A * 3/1991 Hahn .................... E05F 15/668 248/300

(Continued)

*Primary Examiner* — Johnnie A. Shablack
(74) *Attorney, Agent, or Firm* — Alston & Bird LLP

(57) ABSTRACT

A lockout tool assembly for locking open a roll-up door that automatically closes without power is provided. A lockout tool assembly may include a lockout tool member, a first lockout plate, and a second lockout plate. The lockout plate may each define a receiving recess, such that when the first lockout plate and the second lockout plate are installed inverse to one another in a closed lockout alignment position, the receiving recesses are complementary in that they form a crossbar restraint receiving aperture. Methods for locking open a roll-up door with such lockout tool assemblies and for removing installed lockout tool assemblies are also provided.

9 Claims, 6 Drawing Sheets

(56) References Cited

U.S. PATENT DOCUMENTS

| | | | | | |
|---|---|---|---|---|---|
| 5,172,744 | A * | 12/1992 | Finch | E06B 9/174 | 160/133 |
| 5,284,199 | A * | 2/1994 | Finch | E06B 9/58 | 160/133 |
| 5,419,165 | A * | 5/1995 | Perkins | E05B 67/383 | 292/288 |
| 5,450,889 | A * | 9/1995 | Jones | E06B 9/0692 | 160/38 |
| 5,489,130 | A * | 2/1996 | Clark | E05B 65/0021 | 292/DIG. 36 |
| 5,582,042 | A * | 12/1996 | Mordick | E05B 67/383 | 70/57 |
| 5,743,116 | A * | 4/1998 | Suster | E05B 67/383 | 70/14 |
| 5,806,352 | A * | 9/1998 | Axford | E05B 67/36 | 70/56 |
| 5,907,962 | A * | 6/1999 | Smithson | E05B 73/0082 | 70/164 |
| 6,048,000 | A * | 4/2000 | Geringer | E05B 47/0607 | 70/92 |
| 6,205,713 | B1 * | 3/2001 | Thompson | E06B 9/02 | 49/61 |
| 6,273,174 | B1 * | 8/2001 | Singleton | E05F 15/681 | 160/188 |
| 7,428,918 | B2 * | 9/2008 | Martin | E05D 13/1269 | 160/302 |
| 7,665,504 | B2 * | 2/2010 | Schulze | E05F 15/668 | 16/DIG. 1 |
| 8,016,015 | B2 * | 9/2011 | Chamberlain | E05B 67/383 | 160/405 |
| 8,936,064 | B1 * | 1/2015 | Diaz | E05F 15/681 | 292/DIG. 36 |
| 9,027,280 | B2 * | 5/2015 | Huddleston | E06B 9/02 | 49/62 |
| 10,280,651 | B1 * | 5/2019 | Hodge | F16B 45/06 | |
| 10,557,532 | B2 * | 2/2020 | Hill | F16H 21/44 | |
| 10,626,667 | B2 * | 4/2020 | Schulman | E06B 9/322 | |
| 10,662,677 | B1 * | 5/2020 | Fredrick | E05C 7/02 | |
| 2008/0222842 | A1 * | 9/2008 | Faber | E05D 5/02 | 16/86.1 |
| 2012/0138240 | A1 * | 6/2012 | Womacks | E05F 15/673 | 160/32 |
| 2016/0265582 | A1 * | 9/2016 | Abdalla | E05D 15/242 | |
| 2021/0140213 | A1 * | 5/2021 | Bolden | E05D 15/12 | |

* cited by examiner

LOCKOUT TOOL ASSEMBLY FOR AUTOMATIC CLOSING FIRE-RATED ROLL UP DOORS

STATEMENT OF FEDERAL RIGHTS

The United States government has rights in this invention pursuant to Contract No. 89233218CNA000001 between the United States Department of Energy and Triad National Security, LLC for the management and operation of Los Alamos National Laboratory.

TECHNOLOGICAL FIELD

Example embodiments of the present disclosure relate generally to automatically closing fire-rated roll up doors and, more particularly, to lockout tool assemblies for safely locking open such fire-rated roll up doors.

BACKGROUND

Some coiling overhead doors, also known as roll-up doors, are rated to resist fire for certain amounts of time (e.g., one hour). A required feature of such fire-rated roll-up doors is that they close automatically upon loss of power, which protects the contents located behind the roll-up doors from outside fires and/or fires from behind the roll-up door from spreading. Such fire-rated roll-up doors periodically require preventative maintenance, inspections, and/or repairs in order to safely remain operational. As some components of such roll-up doors are inaccessible when closed, preventative maintenance, inspections, and/or repairs often require the roll-up doors to be in the open position and are typically required to be de-energized (e.g., no power such that electrical safety is ensured) for personnel safety pursuant to Lock Out/Tag Out (LOTO) protocols (e.g., anything that can hold electrical energy or potential stored energy, such as gravitational force, is required to be "locked out"). Applicant has identified a number of deficiencies and problems associated with traditional tools and processes for restricting closure of roll-up doors that are configured to automatically close when de-energized. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In accordance with some exemplary embodiments of the present disclosure, a lockout tool assembly for locking open an automatic closing roll-up door, the lockout tool assembly comprising: a lockout tool member; a first lockout plate; and a second lockout plate, wherein the first lockout plate and the second lockout plate each define a receiving recess, such that when the first lockout plate and the second lockout plate are installed inverse to one another in a closed lockout alignment position, the receiving recesses are complementary in that they form a crossbar restraint receiving aperture.

In some embodiments, the lockout tool member comprises an elongate support member, the elongate support member defining a first end and a second end opposite the first end. In some further embodiments, the first end of the elongate support member comprises a coupling member. In still some further embodiments, the coupling member comprises a substantially annular cylindrical body defining a first end and a second end with an axis therebetween. In certain embodiments, a longitudinal axis extends between the first end and the second end of the elongate support member, and wherein the axis of the coupling member is positioned perpendicular to the longitudinal axis of the elongate support member.

In some embodiments, the coupling member comprises one or more set screws.

In some embodiments, an internal surface of the coupling member defines one or more keyways for engagement with a key or key stock.

In some embodiments, the second end of the elongate support member comprises a crossbar restraint shaft member. In some further embodiments, the crossbar restraint shaft member defines a first end and a second end with an axis therebetween, the axis of the crossbar restraint shaft member positioned perpendicular to a longitudinal axis of the elongate support member.

In some embodiments, the crossbar restraint receiving aperture formed by the inverse installation of the first lockout plate and the second lockout plate is configured to receive a portion of the crossbar restraint shaft member.

In some embodiments, at least the first lockout plate defines a radiused edge leading into the receiving recess.

In accordance with another exemplary embodiment of the present disclosure, a method for locking open a fire-rated roll up door is provided, the method comprising: installing a first lockout plate and a second lockout plate onto a mounting plate of a roll-up door assembly; coupling a lockout tool member onto a roll-up door axle of the roll-up door assembly via a coupling member of the lockout tool member; positioning a crossbar restraint shaft member of the lockout tool member against an edge of the mounting plate; and rotating the first lockout plate and the second lockout plate such that a crossbar restraint receiving aperture is formed around the crossbar restraint shaft member.

In some embodiments, the method further comprises closing the roll-up door prior to installing the lockout plates and removing power from the roll-up door assembly.

In some embodiments, installing the first lockout plate and the second lockout plate comprises: aligning a mounting aperture of the first lockout plate with an aperture of the mounting plate; aligning a mounting aperture of the second lockout plate with the aligned mounting aperture of the first lockout plate and the aperture of the mounting plate; positioning a spring-type washer between the first lockout plate and the second lockout plate; and installing a fastener through the aligned mounting aperture of the second lockout plate, the spring-type washer, the mounting aperture of the first lockout plate, and the aperture of the mounting plate.

In some embodiments, the first lockout plate and the second lockout plate each define a receiving recess, and wherein installing the first lockout plate and the second lockout plate comprises inversely positioning the second lockout plate with respect to the first lockout plate such that when the first lockout plate and the second lockout plate are positioned in a lockout alignment position, the receiving recesses are complementary and form the crossbar restraint receiving aperture.

In some embodiments, coupling the lockout tool member onto the roll-up door axle via the coupling member comprises: loosening one or more set screws on the coupling member; sliding the coupling member onto the roll-up door axle until a first end of the coupling member touches a sprocket of the roll-up door assembly; and tightening the one or more set screws of the coupling member. In some further embodiments, sliding the coupling member onto the roll-up door axle comprises: aligning a keyway of the coupling member with a keyway of the roll-up door axle; and installing a key into a joint keyway formed by the alignment of the keyways.

In some embodiments, rotating the first lockout plate and the second lockout plate comprises pivoting the lockout plates from an open installation position to a lockout alignment position, thereby retaining the crossbar restraint shaft member in a fixed orientation.

In some embodiments, inserting a padlock or hasp into aligned padlock apertures of the first lockout plate and the second lockout plate.

In some embodiments, the method further comprises rotating the first lockout plate from around the crossbar restraint member in a counter-clockwise direction; rotating the second lockout plate from around the crossbar restraint member in a clockwise direction; positioning the crossbar restraint shaft member away from the edge of the mounting plate; and removing the lockout tool member from the roll-up door axle.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the figures in accordance with an example embodiment of the present disclosure.

Figure 1B:
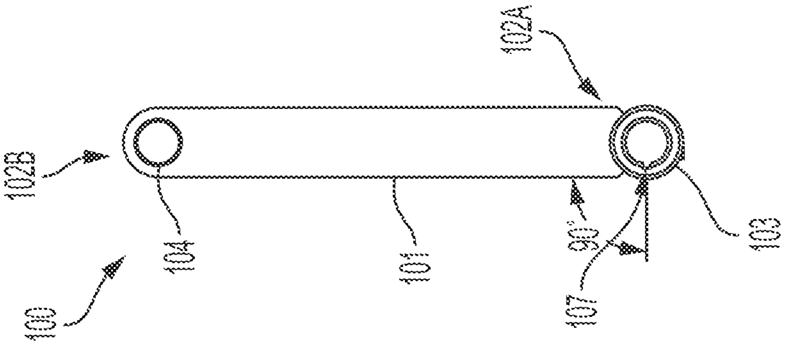
Figure 1A:
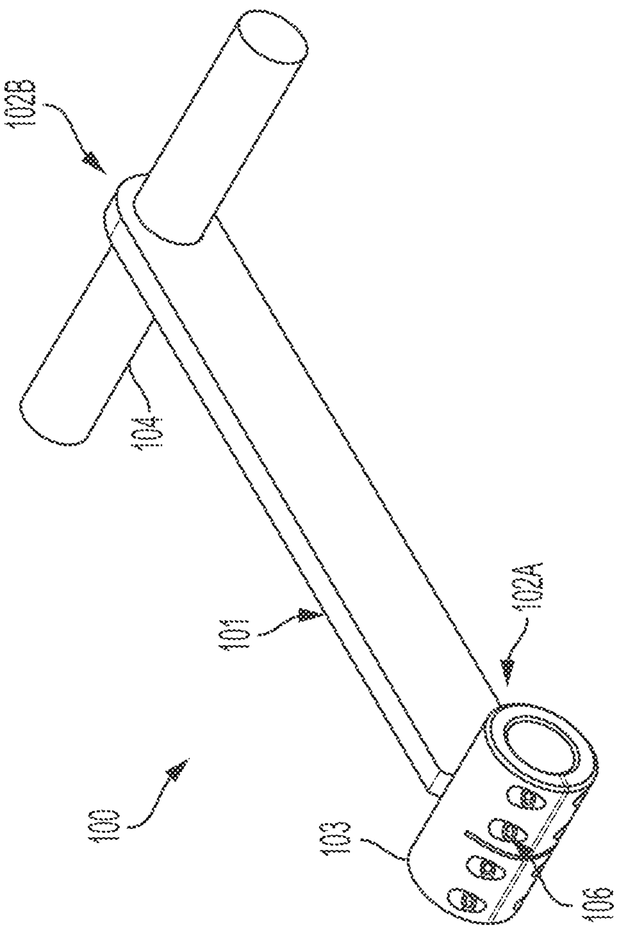

FIGS. 1A and 1B illustrate an example lockout tool member structured in accordance with various example embodiments of the present disclosure.

Figure 2:
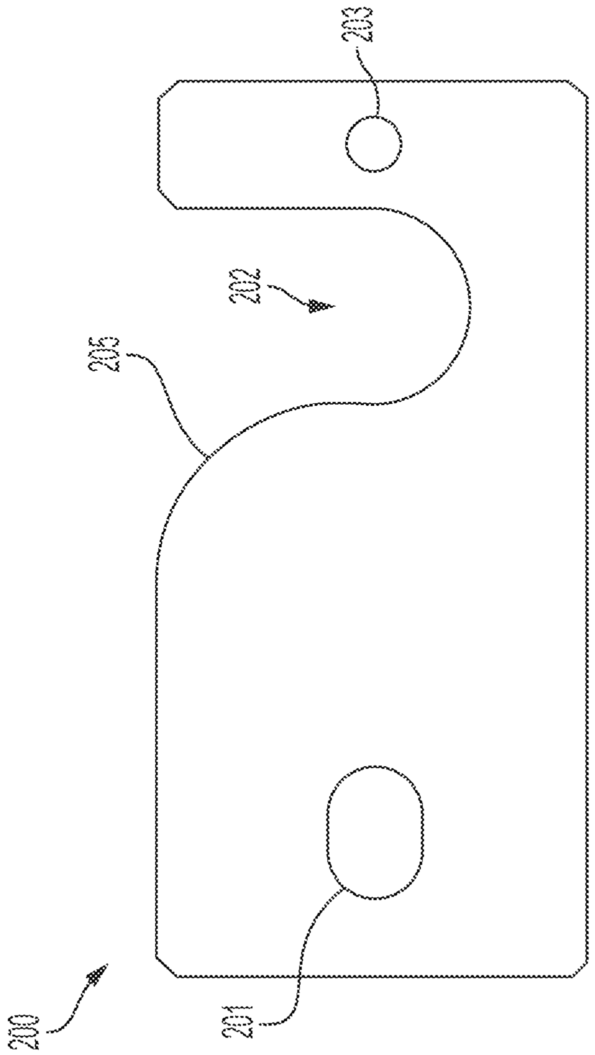

FIG. 2 illustrates an example lockout plate structured in accordance with various example embodiments of the present disclosure.

Figure 3A:
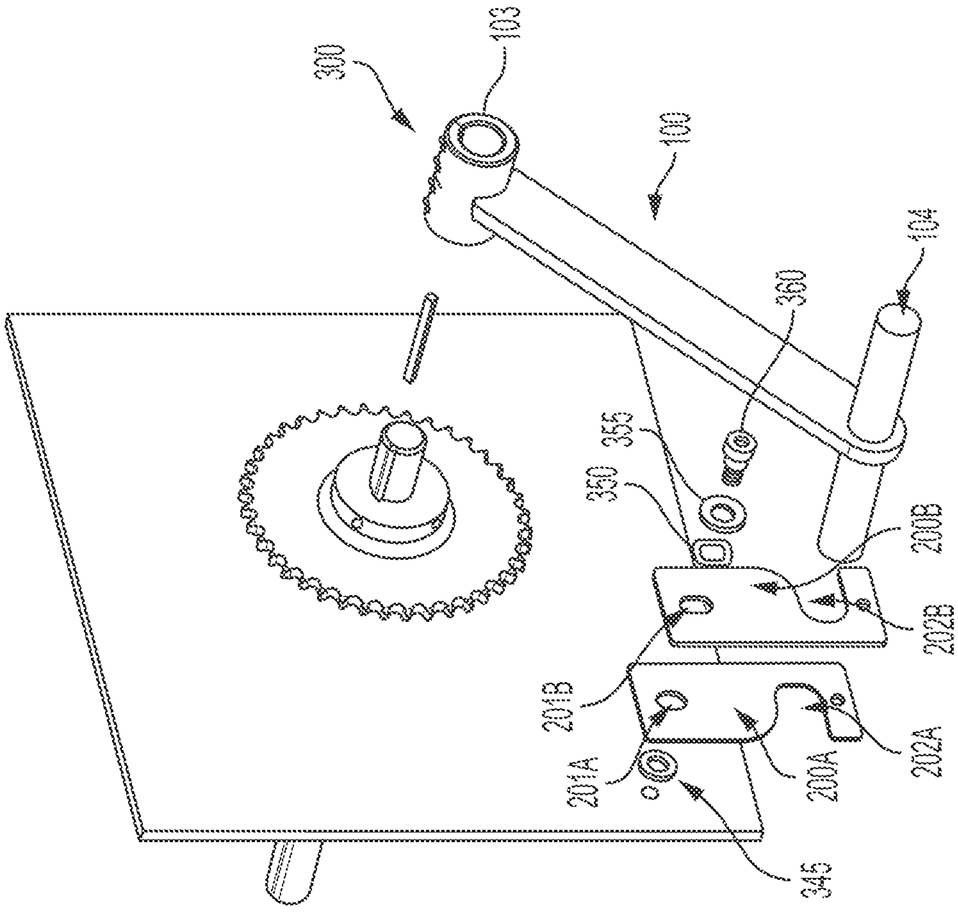
Figure 3B:
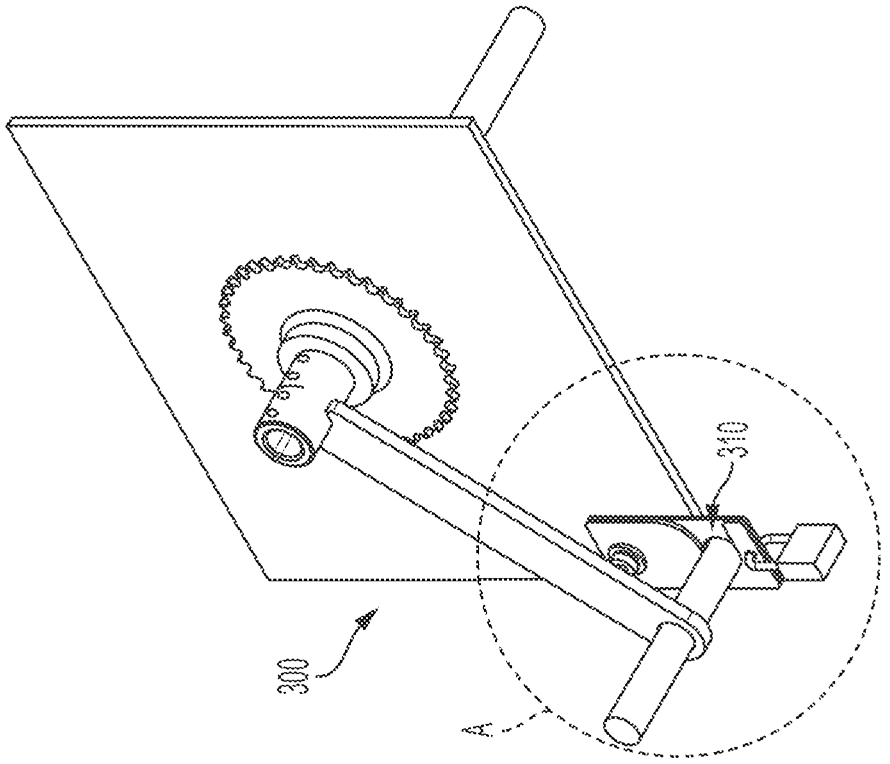
Figure 3C:
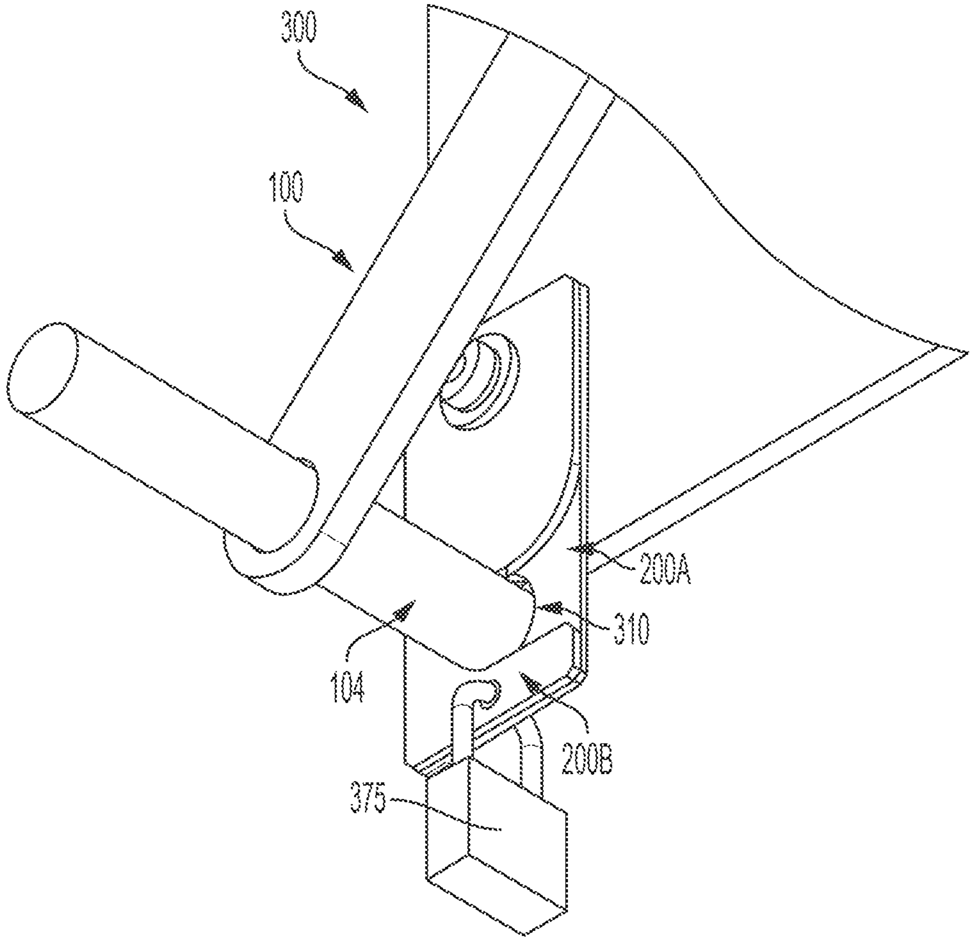

FIGS. 3A-3C illustrate an example lockout tool assembly structured in accordance with various example embodiments of the present disclosure.

Figure 4:
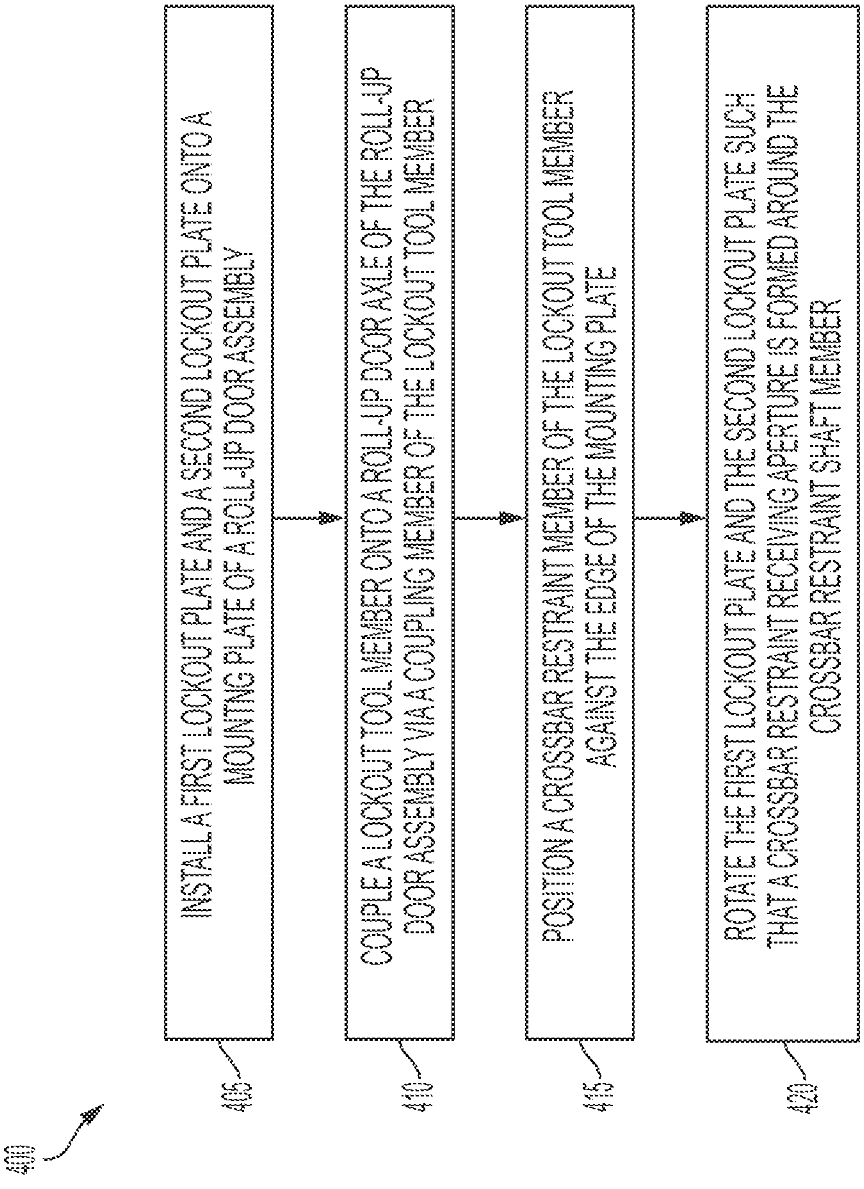

FIG. 4 illustrates a flowchart for locking open a fire-rated roll up door with an example lockout tool assembly structured in accordance with various example embodiments of the present disclosure.

Figure 5:
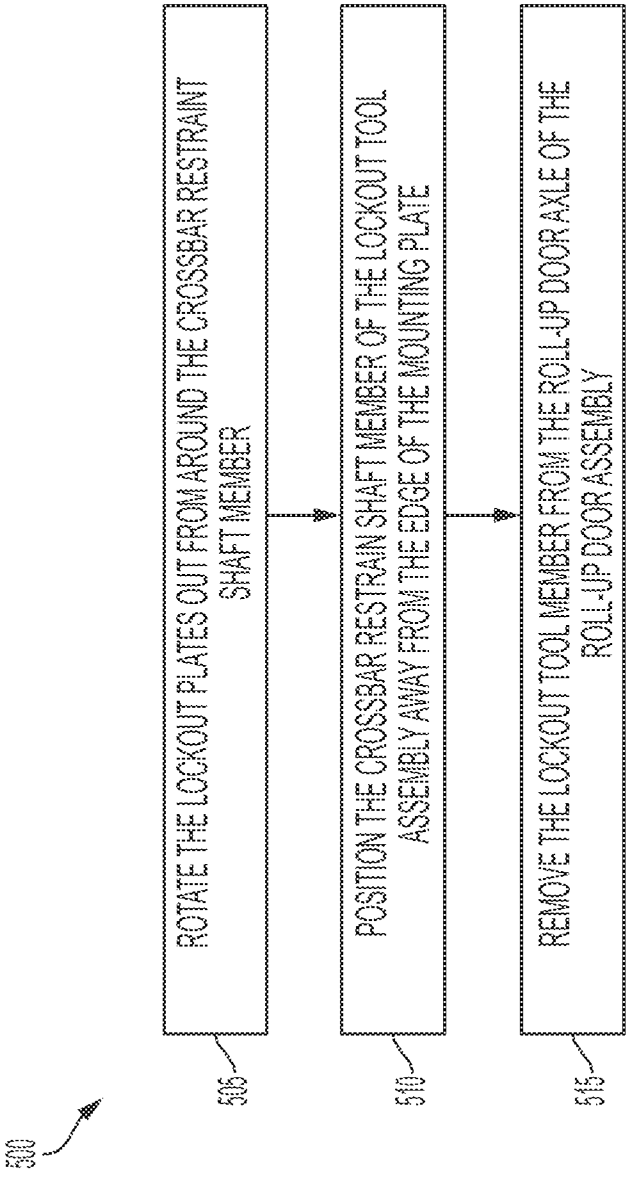

FIG. 5 illustrates a flowchart for removing a lockout tool assembly installed in accordance with various example embodiments of the present disclosure.

DETAILED DESCRIPTION

Example embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details. It should be understood that some, but not all embodiments of the present disclosure are shown and described herein. Indeed, embodiments of the disclosure may be embodied in many different forms, and accordingly this disclosure should not be construed as limited to the embodiments set forth herein; rather, these embodiments are provided so that this disclosure will satisfy applicable legal requirements.

Overview

Roll-up doors typically open and close using a motorized operator which employs an electromagnetic holding brake to keep the door open as long as power is fed to the motorized operator. That is, the electromagnetic holding brake prevents an axle of the roll-up door assembly from turning/rotating which, in turn, prevents a second axle connected by a chain from turning/rotating, such that the roll-up door is held open by the electromagnetic holding brake. As power is removed from the motorized operator, the electromagnetic holding brake disengages and allows the door curtain to slowly uncoil until the door is closed. Stored potential energy in a door in the open position can pose a threat to personnel when performing preventative maintenance, inspections, and/or repairs. That is, a safety hazard could occur if only the electromagnetic holding brake is relied upon to keep the roll-up door open and a power outage, circuit breaker failure, or other safety feature failure (e.g., wire with fusible link that is designed to melt and allow door to close during fire is broken or otherwise disabled) causes the electromagnetic holding brake to disengage while personnel are performing preventative maintenance, inspections, and/or repairs on the roll-up door. It is therefore not possible to safely perform repairs, inspections, and/or preventative maintenance on such roll-up doors with only a traditional electromagnetic holding brake to keep the roll-up doors in the open position.

A fire-rated roll-up door is typically tested (e.g., fire-rated) to verify that it will prevent a fire from going from one side of the roll-up door to the other side of the roll-up door for a specified time (e.g., one hour). Altering the roll-up door assembly, such as drilling holes to install pins in the tracks of the door and/or the door curtain, may also pose a safety hazard and/or invalidate the fire rating of the roll-up door. Once a roll-up door has been tested and/or verified for fire rating, the roll-up should not be altered as it would invalidate the fire rating and/or require re-testing.

Moreover, such automatic closing roll-up doors may include sensors installed on the bottom of the door curtain that when activated (e.g., sense pressure by coming into contact with, for example, an object or personnel), transmit a signal to the motorized operator of the roll-up door in order to reverse the direction of the motorized operator, causing the door curtain to raise (e.g., open the door). Restraining or propping open a roll-up door from the bottom surface of the door curtain, such as with a forklift, may also potentially cause damage to such sensors installed on the bottom of the door curtain. In addition, when preventative maintenance, inspections, and/or repairs of such sensors or the bottom edge of the roll-up door is required, it is not possible to remove the forklift in order to perform such tasks while still keeping the roll-up door propped open when the door assembly is de-energized.

To overcome these problems and others, various embodiments of the present disclosure are directed to a lockout tool assembly for use with automatic closing fire-rated roll up doors or other automatic closing coiling overhead doors. Operation of a roll-up door typically utilizes a chain drive. That is, a chain is run between two sprockets, a first sprocket located on the motorized operator (e.g., drive motor or motor operator) and a second sprocket located on an axle upon which the door curtain is coiled. In this arrangement, sufficient torque from the motor may be transferred to the axle in order to lift the door curtain. The inventor has discovered that it is desirable and advantageous to implement a secondary lockout tool assembly that will restrain the axle of the door curtain against a mounting plate of the roll up door assembly, thereby preventing the axle from turning and uncoiling the door curtain when power is removed. In other words, the secondary lockout tool assembly is configured to prevent the release of the stored potential energy while safely maintaining the door in the open position when power is removed.

In some embodiments, a lockout tool assembly for locking open an automatic closing roll-up door comprises a lockout tool member, a first lockout plate, and a second lockout plate. Some lockout tool member embodiments of the present disclosure comprise a coupling member that may be slid or positioned onto the axle of the door curtain. When the coupling member of the lockout tool member is positioned onto the axle of the door curtain, the lockout tool member may be maneuvered and/or aligned so that the lockout tool member does not interfere with the mounting plate of the door assembly. When the lockout tool member is positioned on the axle and the first lockout plate and the second lockout plate are installed inverse to one another in a closed lockout alignment position, locking the lockout tool member in a fixed position, the lockout tool assembly prevents the axle from turning further once the lockout tool member (e.g., crossbar restrain shaft member) contacts the mounting plate of the door assembly. The installed lockout plates prevent rotation/movement of the locking tool member. In some embodiments, each lockout plate is configured to receive a maintenance lockout padlock, hasp, and/or tag that, once installed, signifies that the roll-up door is safe to work on. The inventor has also discovered that it is desirable and advantageous for the roll-up door to be able to be restrained at a varying range of heights.

These characteristics as well as additional features, functions, and details are described below. Similarly, corresponding and additional embodiments are also described below.

Exemplary Embodiments of the Present Disclosure

FIGS. 1A and 1B depict an example lockout tool member 100 according to one embodiment of the present disclosure. The lockout tool member 100 comprises an elongate support member 101 defining a first end 102A and a second end 102B opposite the first end 102A. A longitudinal axis extends between the first end 102A and the second end 102B of the elongate support member 101.

In some embodiments, the first end 102A of the elongate support member 101 comprises a coupling member 103. For example, in some embodiments, the coupling member 103 is configured to removably couple (e.g., slip fit) the lockout tool member 100 to an axle of a roll-up door assembly. The coupling member 103 is preferably annular or otherwise defines a central cylindrical bore such that the coupling member 103 is configured to cooperatively receive at least a portion of the generally cylindrical axle within the central bore when removably coupling the lockout tool member 100 to the axle of a roll-up door assembly. That is, the coupling member 103 may be a substantially annular cylindrical body as depicted in FIGS. 1A and 1*i*, which provides a rigid shaft coupling for mounting the lockout tool member 100 to the axle of the roll-up door assembly. While FIGS. 1A and 1B illustrate the general size and shape of the central bore of the coupling member 103 as generally cylindrical (e.g., a generally circular cross-section), it is readily appreciated that other shapes and sizes may be used to cooperate with (e.g., complement) and receive any shape and size of axle.

In some embodiments, the coupling member 103 defines a first end and second end with an axis therebetween, the coupling member axis being positioned perpendicular to the longitudinal axis of the elongate support member 101.

In some embodiments, the coupling member 103 is permanently attached (e.g., integrally formed, welded, and/or the like) to the elongate support member 101. For example, in some embodiments, the elongate support member 101 is integrally formed with and/or welded to a portion of the outer surface of the coupling member 103 disposed between the first and second ends of the coupling member 103 as depicted in FIG. 1A.

In some embodiments, the coupling member 103 is structured with one or more set screws 106 configured to engage an outer surface of the portion of the axle of the roll-up door assembly received within the coupling member 103. For example, the coupling member 103 depicted in FIG. 1A comprises four set screws 106 that are accessible for manipulation from an outer surface of the coupling member 103.

In some embodiments, the coupling member 103 may be a keyed hub for engaging with a roll-up door axle. For example, in some embodiments, the internal surface of the coupling member 103 may define one or more internal grooves or slots as depicted in FIG. 1B, the one or more internal grooves or slots forming a keyway for engagement with a key or key stock. That is, in some embodiments, the internal surface of the coupling member 103 defines a keyway 107, such as a square keyway, though the keyway 107 may be of any profile for engaging a corresponding profile portion of a key or key stock.

In some embodiments, the second end 102B of the elongate support member 101 comprises a crossbar restraint shaft member 104. For example, in some embodiments, once the coupling member 103 of the lockout tool member 100 is removably coupled (e.g., slip fit) to the axle of the roll-up door assembly as described herein, the crossbar restraint shaft member 104 is configured to assist in restraining or restricting the rotational motion of the axle. In some embodiments, the crossbar restraint shaft member 104 defines a first end and second end with an axis therebetween, the crossbar restraint shaft member axis being positioned perpendicular to the longitudinal axis of the elongate support member 101. While FIGS. 1A and 1B illustrate the general size and shape of the crossbar restraint shaft member 104 as generally cylindrical (e.g., a generally circular cross-section), it is readily appreciated that other shapes and sizes may be used to assist in restraining or restricting the rotational motion of the axle. In some embodiments, the crossbar restraint shaft member 104 is permanently attached (e.g., integrally formed, welded, and/or the like) to the elongate support member 101. For example, in some embodiments, the elongate support member 101 comprises an aperture at the second end 102B through which the crossbar restraint shaft member 104 is positioned and welded as depicted in FIG. 1A.

In some embodiments, the lockout tool member 100 comprises steel and/or any other material that provides sufficient strength to the lockout tool member 100. That is, the lockout tool member 100 is configured to withstand the maximum torque that can be delivered to the lockout tool member 100 by the motor operator of the roll-up door assembly, which, by design, must exceed the torque applied by the weight of the door.

Turning to FIG. 2, an example lockout plate according to one embodiment of the present disclosure is depicted. In some embodiments, the lockout plate 200 may be generally rectangular with two opposing shorter sides and two opposing longer sides. The lockout plate 200 may define a receiving recess 202. For example, when installed, two or more lockout plates 200 may be positioned inverse to one another in the closed lockout alignment position such that the receiving recesses 202 are complementary in that they form a crossbar restraint receiving aperture 310 (e.g., as depicted in FIG. 3B and FIG. 3C), the formed crossbar restraint receiving aperture 310 configured to receive the crossbar restraint shaft member 104, thereby retaining the lockout tool member 100 in a fixed orientation. That is, when the crossbar restraint shaft member 104 is captured in the crossbar restraint receiving aperture 310 that is formed by the complementary positioning of the receiving recesses 202 of the lockout plates in the lockout alignment position such that the crossbar restraint shaft member 104 (and ultimately the lockout tool member 100) is retained in a fixed orientation, the lockout tool assembly 300 thereby restricts rotation of the axle of the roll-up door assembly.

In some embodiments, the lockout plate may be shaped in order to reduce friction and/or help guide the crossbar restraint shaft member 104 into the receiving recess 202 during operation. For example, the lockout plate 200 may include a radiused edge 205 leading from the side of the lockout plate 200 into the receiving recess 202.

In some embodiments, the lockout plate 200 is configured to be attached and/or mounted to a mounting plate of a roll-up door assembly. That is, in some embodiments, as depicted in FIG. 2, each lockout plate 200 defines a mounting aperture 202 through which a shoulder screw or other fastener may be received in order to secure and install the lockout plates 200 onto the mounting plate of the roll-up door assembly. The mounting aperture 202 is defined such that the mounting apertures 202 of two or more lockout plates 200 are aligned when such lockout plates 200 are inversely positioned with respect to one another, such as depicted in FIGS. 3A-3B.

The lockout plates 200 may be mounted/installed on either side of the mounting plate of the roll-up door assembly. In other words, it is contemplated by this disclosure that the lockout plates 200 may be installed/mounted on either surface or side (e.g., inner facing toward the door curtain or outer facing away from the door curtain) of the mounting plate as is necessary to properly align the formed crossbar restraint receiving aperture 310 (e.g., formed by the complementary interaction of the receiving recesses 202 of the lockout plates 200 in the lockout alignment position) with the crossbar restraint shaft member 104 of the lockout tool member 100 during operation as depicted in FIGS. 3A-3C and as described herein in relation to FIG. 4. For example, in some embodiments, the mounting aperture(s) 201 of the lockout plate(s) 200 may be an elongated slot to allow for sufficient minor adjustments in installing the lockout plate(s) 200 and aligning with the crossbar restraint shaft member 104 of the lockout tool member 100.

In some embodiments, the lockout plates 200 may be installed to allow for individual rotation and/or pivot of the installed lockout plates 200. That is, one or more washers, springs, fasteners, screws, etc. may be used to install the lockout plates 200 onto the mounting plate and at least one washer may be configured to enable individual rotation of each lockout plate 200 in a clockwise and/or counter-clockwise direction. For example, two or more lockout plates 200 may be installed with a triple-wave washer 350 (as depicted in FIG. 3A) positioned therebetween, such that when tightened, spring pressure holds the lockout plates 200 slightly apart, allowing the user to be able to swing the lockout plates 200 out of the way into an open installation position and/or into a closed lockout alignment position.

In some embodiments, the lockout plate 200 is configured to receive a maintenance lockout padlock, hasp, and/or tag that signifies that the roll-up door is safe to work on (e.g., in accordance with LOTO procedures). That is, in some embodiments, as depicted in FIG. 2, each lockout plate 200 defines a padlock aperture 203 for receiving a padlock, hasp, and/or tag (e.g., such as the lockout padlock 375 depicted in FIG. 3C). When two or more lockout plates are positioned in the lockout alignment position, the padlock aperture 203 of each lockout plate 200 is in alignment such that the padlock, hasp, and/or tag (e.g., lockout padlock 375) may be installed and secured through the aligned padlock apertures 203. With the padlock, hasp, and/or tag secured through the aligned padlock apertures 203, the lockout plates 200 are restricted from being opened, separated, and/or otherwise removed from the lockout alignment position as described herein.

Turning to FIGS. 3A-3C, installation of a lockout tool assembly 300 in relation to an example mounting plate and roll-up door axle of a roll-up door assembly is depicted. In particular, FIG. 3A depicts an exploded view of the lockout tool assembly 300, including the lockout tool member 100, a first lockout plate 200A, and a second lockout plate 200B, being installed in relation to the roll-up door assembly. For example, installation of the lockout plates 200A, 200B may require one or more washers, springs, fasteners, screws, etc. to install the lockout plates 200A, 200B onto the mounting plate. In some embodiments, the mounting plate comprises one or more threaded apertures which may be provided by the door manufacturer or formed after installation of the door. As depicted in the exploded view of FIG. 3A, in some embodiments, the mounting aperture 201A of the first lockout plate 200A is aligned with an aperture of the mounting plate and a flat washer 345 may be placed between the mounting plate and the first lockout plate 200A. In some embodiments, a second washer, such as a triple-wave washer 350 (or other spring-like washer), may be positioned between the first lockout plate 200A and the second lockout plate 200B.

As further depicted, the mounting aperture 201B of the second lockout plate 201B (inversely positioned with respect to the first lockout plate 201A) may be aligned with the aperture of the mounting plate of the roll-up door assembly, the mounting aperture 201A of the first lockout plate 200A, and the triple-wave washer 350. A flat washer 355 and a fastener (e.g., shoulder screw 360) may thereafter be used to secure the lockout plates 200A, 200B onto the mounting plate of the roll-up door assembly. When tightened, spring pressure from the triple-wave washer 350 (or other spring-like washer) holds the lockout plates 200A, 200B slightly apart, allowing the user to be able to swing the lockout plates 200A, 200B out of the way into an open installation position and/or into a closed lockout alignment position.

FIG. 3B depicts the example lockout tool assembly 300 as installed, and FIG. 3C depicts the detailed view of the circle A of the example lockout tool assembly 300 as installed in FIG. 3B. The lockout plates 200A, 200B are in the closed lockout alignment position in FIGS. 3A-3C. That is, the first lockout plate 200A is positioned inversely to the second lockout plate 200B such that the receiving recesses 202A, 202B are complementary to one another in that they form a crossbar restraint receiving aperture 310 (e.g., as depicted in FIG. 3B and FIG. 3C), the formed crossbar restraint receiving aperture 310 configured to retain the lockout tool member 100 in a fixed orientation.

Example Methods

Having described exemplary lockout tool assemblies, it should be understood that various methods may be used to lockout an automatic closing roll-up door with lockout tool assemblies of the present disclosure. FIG. 4 is a flowchart broadly illustrating a method 400 comprising a series of steps that are performed to lock open a fire-rated roll-up door (e.g., configured to automatically close) using a lockout tool assembly structured in accordance with example embodiments of the present disclosure.

As shown in step 405, the method 400 comprises installing a first lockout plate and a second lockout plate onto a mounting plate of a roll-up door assembly. Although depicted as being installed on the outer surface/side of the mounting plate in FIGS. 3A-3C, it is contemplated by this disclosure that the lockout plates may be installed and/or mounted on either surface/side of the mounting plate of the roll-up door assembly as is necessary to properly align the crossbar restraint receiving aperture (e.g., formed by the complementary interaction of the of receiving recesses of the lockout plates in the lockout alignment position) with the crossbar restraint shaft member of the lockout tool member during operation as described herein.

One or more washers, springs, fasteners, screws, etc. may be used to install the lockout plates onto the mounting plate. For example, as depicted in the exploded view of FIG. 3A, in some embodiments, a mounting aperture of the first lockout plate (e.g., lockout plate 200A) is aligned with an aperture of the mounting plate and a first washer (e.g., a flat washer 345) may be placed between the mounting plate and the first lockout plate (e.g., lockout plate 200A). In some embodiments, a second washer, such as a triple-wave washer 350 (or other spring-like washer), may be positioned between the first lockout plate (e.g., lockout plate 200A) and the second lockout plate (e.g., lockout plate 200B), such that when tightened, spring pressure holds the lockout plates (e.g., first lockout plate 200A and second lockout plate 200B) slightly apart, allowing the user to be able to swing the lockout plates (e.g., first lockout plate 200A and second lockout plate 200B) out of the way into an open installation position and/or into a closed lockout alignment position. For example, once installed onto the mounting plate, the first lockout plate (e.g., first lockout plate 200A) may be rotated counter-clockwise and the second lockout plate (e.g., second lockout plate 200B) may be rotated clockwise and the spring pressure of the triple-wave washer 350 may allow the lockout plates (e.g., first lockout plate 200A and second lockout plate 200B) to stay in such rotated-out position (e.g., open installation position) until necessary to rotate back into position (e.g., closed lockout alignment position). In some embodiments, installing the lockout plates comprises positioning the lockout plates (e.g., first lockout plate 200A and second lockout plate 200B) in a closed lockout alignment position. In some embodiments, a third washer (e.g., flat washer 355) and a fastener (e.g., shoulder screw 360) may be thereafter used to secure the lockout plates (e.g., first lockout plate 200A and second lockout plate 200B) onto the mounting plate of the roll-up door assembly.

Although not depicted, prior to installing the lockout plates in step 405, the user may optionally close the roll-up door and remove power from the roll-up door assembly. For example, the user may shut off electrical power at an associated circuit breaker. The user may optionally confirm or verify that the roll-up door does not operate by pushing the up/down button of the roll-up door. After confirming that the roll-up door assembly is de-energized, the user may install the first and second lockout plates onto the mounting plate of the roll-up door assembly as described herein.

After installing the lockout plates, the user may optionally restore power to the roll-up door via the associated circuit breaker and open the roll-up door to a sufficient height (e.g., to be able to access the bottom surface of the door curtain). Depending on any preference and/or height of the user, for example, the roll-up door may be positioned at any of a varying range of heights, enabling the roll-up door to be restrained at any of such varying range of heights. The user may manipulate the up/down switch of the roll-up door such that a keyway of the roll-up door axle is located at a certain position to be able to receive the coupling member of the lockout tool member. For example, the user may bump the up/down switch to attain a configuration wherein the keyway of the roll-up door axle is located at approximately the 3 o'clock or the 9 o'clock (e.g., as facing the sprocket end). It is contemplated by this disclosure that the keyway of the roll-up door axle may be positioned as is necessary to receive the coupling member of the lockout tool member and enable the lockout tool member to align with the lockout alignment position of the lockout plates.

After aligning the keyway of the roll-up door axle, the user may optionally prop open the roll-up door, such as by positioning a forklift below the bottom surface of the roll-up door. For example, the user may position the tines of the forklift approximately ½ inch to 1 inch below the bottom surface of the roll-up door. The user may optionally remove power from the roll-up door assembly after positioning the forklift. Once the electrical power is removed from the roll-up door assembly, the door will automatically begin to close as gravity will overcome the spring tension after the electromagnetic holding brake disengages (e.g., due to lack of power). For example, the door may slowly lower after a time delay. The user may allow the roll-up door to lower onto the tines of the forklift.

As shown in step 410, the method 400 further comprises coupling a lockout tool member onto a roll-up door axle of the roll-up door assembly via a coupling member of the lockout tool member. For example, the user may loosen the set screw(s) on the coupling member and slide the coupling member (e.g., coupling member 103) of the lockout tool member onto the roll-up door axle until the first end of the coupling member touches the sprocket of the roll-up door assembly in order to removably couple (e.g., slip fit) the lockout tool member (e.g., lockout tool member 100) to the axle of a roll-up door assembly. Sliding the coupling member onto the roll-up door axle may comprise aligning the keyway of the coupling member, functioning as a keyed hub, with the keyway of the roll-up door axle and installing a key (e.g., a square key stock) into the formed joint keyway, thereby rotationally locking the coupling member (e.g., the lockout tool member) to the roll-up door axle. If the keyway of the roll-up door axle and the keyway of the coupling member cannot be sufficiently aligned to form the joint keyway when sliding the first end of the coupling member onto the roll-up door axle, the lockout tool member may be flipped over so as to slide the second end of the coupling member onto the roll-up door axle and sufficiently align the individual keyways to form the joint keyway.

Additionally or alternatively, coupling the lockout tool member onto a roll-up door axle may comprise tightening the one or more set screws of the coupling member to sufficiently keep the lockout tool member from sliding off of the roll-up door axle. In some embodiments, the user optionally rotates the lockout plates from the closed lockout alignment position to the open installation position.

Turning to step 415, the method 400 comprises positioning the crossbar restraint shaft member of the lockout tool member against the edge of the mounting plate. For example, positioning the lockout tool member may comprise slowly lowering the tines of the forklift and allowing the elongate support member of the lockout tool member to rotate (e.g., with the roll-up door axle) clockwise until the crossbar restraint shaft member touches the edge of the mounting plate of the roll-up door assembly.

Turning to step 420, the method 400 comprises rotating the first lockout plate and the second lockout plate such that a crossbar restraint receiving aperture is formed around the crossbar restraint shaft member. For example, as the lockout plates are pivoted from the open installation position to the lockout alignment position, the receiving recesses of the lockout plates close around and capture the crossbar restraint shaft member in a crossbar restraint receiving aperture (e.g., crossbar restraint receiving aperture 310) formed by the lockout alignment position, retaining the lockout tool member in a fixed orientation such that the lockout tool assembly (e.g., lockout tool assembly 300) restricts rotation of the roll-up door axle. The user may optionally insert a padlock or hasp (e.g., a LOTO padlock or hasp such as padlock 375) into the padlock aperture (e.g., padlock aperture 203) to prevent the lockout plates from opening from the lockout alignment position and remove the forklift from the roll-up door work zone. The user may now safely perform maintenance, inspections, and/or repairs to the roll-up door without risk of the roll-up door axle rotating and/or the door curtain closing.

FIG. 5 is a flowchart broadly illustrating a method 500 comprising a series of steps that are performed to remove an installed lockout tool assembly in accordance with example embodiments of the present disclosure. For example, subsequent to installing the lockout tool assembly in accordance with method 400 (e.g., in order to safely perform maintenance, inspections, and/or repairs to the roll-up door), the user may utilize method 500 to safely remove the installed lockout tool assembly from the roll-up door assembly.

As shown in step 505, the method 500 comprises rotating the lockout plates out from around the crossbar restraint shaft member. For example, as described with respect to step 420, the lockout plates may be closed around the crossbar restraint shaft member in a lockout alignment position, capturing and restraining the crossbar restraint shaft member, and step 505 may comprise rotating and/or pivoting the lockout plates out from such lockout alignment position to an open installation position (e.g., sufficiently rotated out to allow the crossbar restraint shaft member to no longer be restrained). As described herein, a spring washer or other sufficient spring pressure may be installed between the lockout plates, allowing the lockout plates to be pivoted out to and/or retained in the open installation position. For example, step 505 may comprise rotating the first lockout plate from around the crossbar restraint member in a counter-clockwise direction and rotating the second lockout plate from around the crossbar restraint member in a clockwise direction. Alternatively, step 505 may comprise rotating the first lockout plate from around the crossbar restraint member in a clockwise direction and rotating the second lockout plate from around the crossbar restraint member in a counter-clockwise direction.

Although not depicted, prior to rotating out the lockout plates, the user may optionally position a forklift below the bottom surface of the roll-up door (e.g., ½ inch to 1 inch below the bottom surface) and remove any padlock, hasp, and/or tag that may have been previously installed (e.g., to prevent the lockout plates from opening from the lockout alignment position) into the aligned padlock apertures of the lockout plates.

As shown in step 510, the method 500 comprises positioning the crossbar restraint shaft member of the lockout tool member away from the edge of the mounting plate. That is, the power may be optionally restored to the roll-up door assembly, allowing the user to "bump" the roll-up door operator control button up and enabling the lockout tool member 100 to rotate counter-clockwise down and away from the mounting plate of the roll-up door assembly (e.g., to approximately the 6 o'clock position). Step 510 may optionally comprise reposition the tines of the forklift under the bottom of the roll-up door in order to support the roll-up door. For example, the user may optionally position the forklift tines so that when the electrical power to the roll-up door assembly is removed and the roll-up door automatically begins to lower, the roll-up door will not lower enough to "bind" the lockout tool member against the mounting plate of the roll-up door. Once the roll-up door is allowed to be lowered onto the tines of the forklift, the power to the roll-up door assembly may be optionally removed (e.g., shut off power to the roll-up door assembly via a circuit breaker).

Turning to step 515, method 500 further comprises removing the lockout tool member from the roll-up door axel of the roll-up door assembly. For example, the user may sufficiently loosen any tightened set screws on the coupling member and/or remove an installed key stock in order to allow the lockout tool member to be removed from the roll-up door axle. A bearing puller may be required to remove the lockout tool member.

After removing the lockout tool member, the user may optionally remove the lockout plates. In some embodiments, the lockout plates may be retained on the mounting plate in an open installment position as long as they do not interfere with operation of the fire-rated roll-up door. Additionally or alternatively, the user may restore power to the roll-up door assembly and sufficiently open (e.g., pressing the roll-up door operator control button up), the roll-up door to allow any forklift to be removed and remove the forklift from the roll-up door work zone. The roll-up door may now safely operate.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while steps or processes are depicted in the drawings in a particular order, this should not be understood as requiring that such steps or processes be performed in the particular order shown or in sequential order, or that all illustrated steps or processes be performed, to achieve desirable results, unless described otherwise. Said differently, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Overview of Terms

For the purposes of the present application, the following terms shall have the following meanings:

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the terms "illustrative," "example," "exemplary" and the like are used to mean "serving as an example, instance, or illustration" with no indication of quality level. Any implementation described herein as "exemplary" or "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "about," "approximately," or the like, when used with a number, may mean that specific number, or alternatively, a range in proximity to the specific number, as understood by persons of skill in the art field.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%. Similarly, where a list is presented, unless stated otherwise, it is to be understood that each individual element of that list, and every combination of components of that list, is a separate embodiment. For example, "1, 2, 3, 4, and 5" encompasses, among numerous embodiments, 1; 2; 3; 1 and 2; 3 and 5; 1, 3, and 5; and 1, 2, 4, and 5.

The term "plurality" refers to two or more items.

The term "set" refers to a collection of one or more items.

The term "or" is used herein in both the alternative and conjunctive sense, unless otherwise indicated.

While the present disclosure has been particularly described in conjunction with specific examples, it is evident that many alternatives, modifications, and variations will be apparent to those skilled in the art in light of the foregoing description. It is therefore contemplated that the appended claims will embrace any such alternatives, modifications, and variations as falling within the scope and spirit of the present disclosure.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for locking open a fire-rated roll up door, the method comprising:

installing a first lockout plate and a second lockout plate onto a mounting plate of a roll-up door assembly;

coupling a lockout tool member onto a roll-up door axle of the roll-up door assembly via a coupling member of the lockout tool member;

positioning a crossbar restraint shaft member of the lockout tool member against an edge of the mounting plate; and rotating the first lockout plate and the second lockout plate such that a crossbar restraint receiving aperture is formed around the crossbar restraint shaft member.

2. The method of claim 1, further comprising:

prior to installing the first and second lockout plates, closing the roll-up door; and removing power from the roll-up door assembly.

3. The method of claim 1, wherein installing the first lockout plate and the second lockout plate comprises:

aligning a mounting aperture of the first lockout plate with an aperture of the mounting plate;

aligning a mounting aperture of the second lockout plate with the aligned mounting aperture of the first lockout plate and the aperture of the mounting plate;

positioning a spring-type washer between the first lockout plate and the second lockout plate; and installing a fastener through the aligned mounting aperture of the second lockout plate, the spring-type washer, the mounting aperture of the first lockout plate, and the aperture of the mounting plate.

4. The method of claim 1, wherein the first lockout plate and the second lockout plate each define a receiving recess, and wherein installing the first lockout plate and the second lockout plate comprises inversely positioning the second lockout plate with respect to the first lockout plate such that when the first lockout plate and the second lockout plate are positioned in a lockout alignment position, the receiving recesses are complementary and form the crossbar restraint receiving aperture.

5. The method of claim 1, wherein rotating the first lockout plate and the second lockout plate comprises pivoting the first and second lockout plates from an open installation position to a lockout alignment position, thereby retaining the crossbar restraint shaft member in a fixed orientation.

6. The method of claim 1, further comprising:

inserting a padlock or hasp into aligned padlock apertures of the first lockout plate and the second lockout plate.

7. The method of claim 1, further comprising:

rotating the first lockout plate from around the crossbar restraint shaft member in a counter-clockwise direction;

rotating the second lockout plate from around the crossbar restraint shaft member in a clockwise direction;

positioning the crossbar restraint shaft member away from the edge of the mounting plate; and removing the lockout tool member from the roll-up door axle.

8. The method claim 1, wherein coupling the lockout tool member onto the roll-up door axle via the coupling member comprises:

loosening one or more set screws on the coupling member;

sliding the coupling member onto the roll-up door axle until a first end of the coupling member touches a sprocket of the roll-up door assembly; and tightening the one or more set screws of the coupling member.

9. The method of claim 8, wherein sliding the coupling member onto the roll-up door axle comprises:

aligning a keyway of the coupling member with a keyway of the roll-up door axle; and installing a key into a joint keyway formed by the alignment of the keyways.

* * * * *